United States Patent Office 3,404,177
Patented Oct. 1, 1968

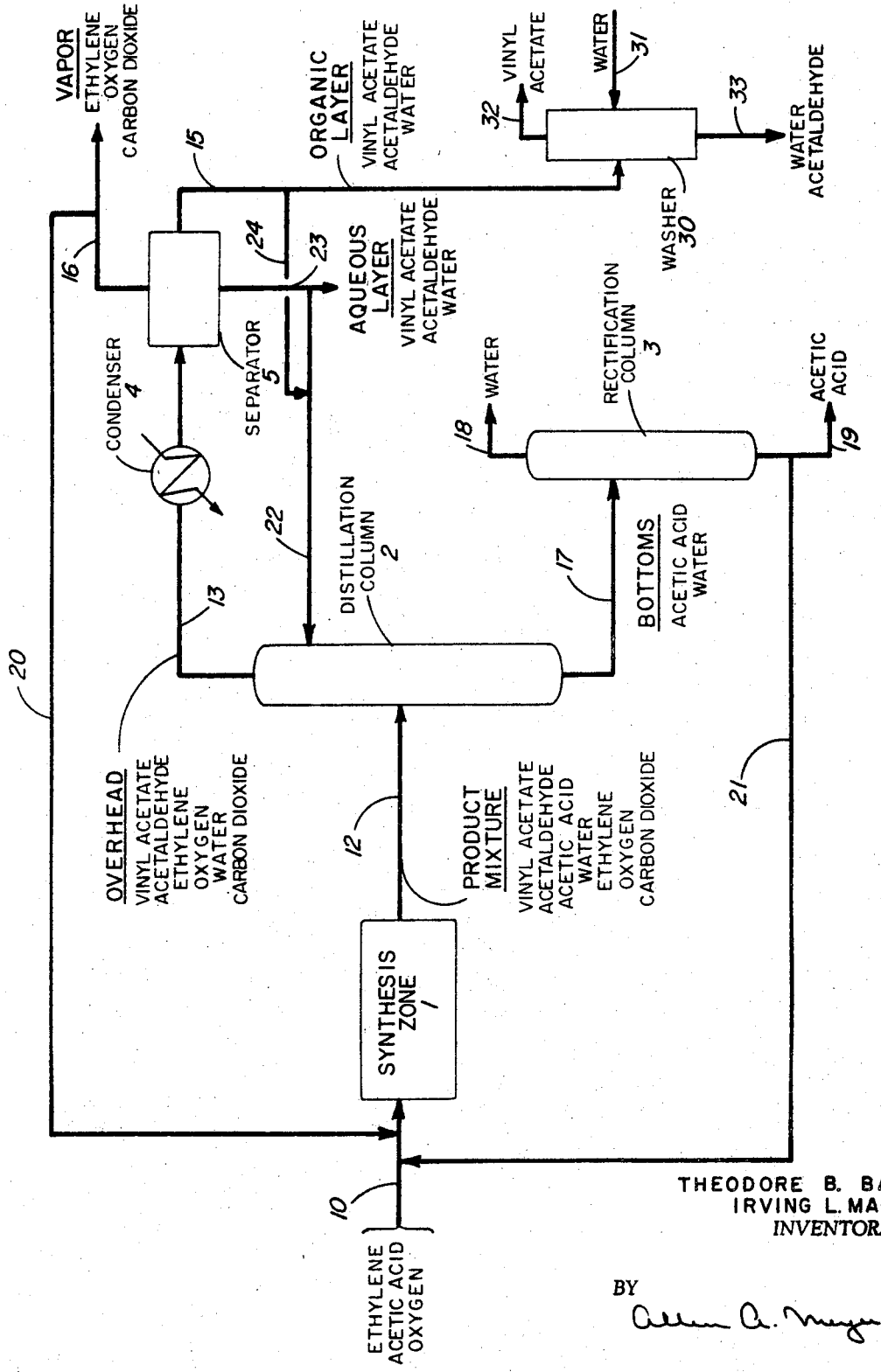

3,404,177
PRODUCING AND RECOVERING VINYL ACETATE FROM A GASEOUS MIXTURE BY FRACTIONAL DISTILLATION
Theodore B. Baba, Hillsdale, N.J., and Irving L. Mador, Cincinnati, Ohio, assignors to National Distillers and Chemical Corporation, New York, N.Y., a corporation of Virginia
Filed Sept. 2, 1965, Ser. No. 484,631
2 Claims. (Cl. 260—497)

ABSTRACT OF THE DISCLOSURE

A process for separating vinyl acetate from a gaseous feed mixture comprising vinyl acetate, acetic acid, water, and other gases such as ethylene, oxygen and carbon dioxide, as well as mixtures thereof. The process comprises distilling the gaseous feed mixture at an elevated temperature, recovering a bottom fraction containing acetic acid and a major portion of the water, and an overhead fraction containing vinyl acetate and the other gases. The overhead fraction is cooled to condense the vinyl acetate component which is then recovered. Unreacted acetic acid, ethylene and oxygen may be recycled to a vinyl acetate vapor phase synthesis step.

---

The present invention relates to a process for the recovery of vinyl acetate from mixtures thereof. More specifically, the invention pertains to a process for recovering vinyl acetate from a reaction product mixture obtained by the catalytic reaction in the vapor phase of ethylene, acetic acid and an oxygen-containing gas.

The preparation of vinyl acetate by the use of a vapor phase process is disclosed in United States Patent No. 3,190,912. In general, the process comprises passing a reaction mixture containing ethylene, acetic acid and an oxygen-containing gas, such as oxygen or air, in vapor form over a solid catalytic mass. The disclosed catalysts are members of the platinum or palladium groups of metals, oxides or salts thereof, which are generally supported on inert carriers. The reaction product mixture was found to contain vinyl acetate, ethylene, acetic acid, oxygen, carbon dioxide and water. The unreacted ethylene, acetic acid and oxygen occur in the reaction product mixture either as a result of incomplete conversion, although substantial degrees of conversion can be achieved in the synthesis reaction, or because the reactants have been fed into the reaction zone in non-stoichiometric ratios, for example, where one or more of the reactants are employed in an excess amount to produce certain desirable effects. The water is a direct by-product of the reaction, although additional water and the carbon dioxide are formed as a result of side reactions such as the combustion of ethylene. Acetaldehyde may also be a by-product of the synthesis, and if present will be found only in trace amounts.

For commercial purposes the vinyl acetate must be recovered from the reaction product mixture in a substantially pure form, although for some purposes the presence of minor amounts of water may be tolerated. It is also highly advantageous to avoid any loss of the vinyl acetate by deleterious reactions during the recovery procedure. Such further reactions of the vinyl acetate are also undesirable, since they necessitate additional steps to remove the vinyl acetate decomposition products. Obviously, the vinyl acetate separation procedure should also provide means for readily recovering any unreacted ethylene, acetic acid or oxygen-containing gases, since the economics of the synthesis process would be greatly enhanced by the recycling of such materials. In actual practice it has been found that the recovery of the vinyl acetate from the aforedescribed reaction product mixture is not easily accomplished without encountering a reduction in the yield of the vinyl acetate. Thus, for example, when the vaporous reaction product mixture obtained from the synthesis reaction zone is subjected to condensation, a conventional step in such recovery procedures, the condensate comprises vinyl acetate, acetic acid, acetaldehyde and water. As previously discussed, it is desirable to recover the vinyl acetate and to separate the acetic acid for recycle. However, when the condensate was subjected to typical techniques where these compounds were in contact for any substantial period of time, and especially where the separation technique involved the use of elevated temperatures, the vinyl acetate product was partially or substantially destroyed. This deleterious result occurs because of the hydrolysis of the vinyl acetate by reaction with the water to form substantial quantities of acetaldehyde. It was further found that this side reaction was catalyzed by the presence of the acetic acid. Although it was known that strong acids or bases would function as catalysts for the hydrolysis of vinyl acetate, it was unexpectedly found that a weak acid, such as acetic acid, was capable of catalyzing the hydrolysis reaction. Not only does the hydrolysis of vinyl acetate result in an undesirable loss of the desired product, but special separation procedures would have to be employed to remove the substantial amounts of acetaldehyde which would then be present.

One object of the present invention is to provide a process for recovering vinyl acetate from gaseous admixtures thereof with acetic acid and water which avoids the difficulties encountered utilizing conventional procedures.

Another object of the present invention is to provide a process for the recovery of vinyl acetate from the reaction product mixture obtained in the vapor phase synthesis of vinyl acetate from ethylene, acetic acid, and an oxygen-containing gas.

A further object of the present invention is to provide a process for treating a gaseous admixture of vinyl acetate, ethylene, acetic acid, water, oxygen and incidental impurities such as carbon dioxide and acetaldehyde to remove vinyl acetate therefrom while avoiding its hydrolysis.

A still further object of the present invention is to provide a process for recovering vinyl acetate from the reaction product mixture and for recycling unreacted feed materials.

These and other objects of the present invention will become readily apparent from the ensuing description and illustrative embodiments.

In accordance with the present invention it has now been found that effective separation of the vinyl acetate from the reaction product mixture obtained in the vapor phase synthesis of vinyl acetate, as described above, can readily be accomplished by directly feeding the reaction product mixture, in vapor form, to a distillation column. The distillation is carried out under such conditions that the overhead fraction consists of vinyl acetate, ethylene, oxygen, carbon dioxide, water, and other low boiling incidental impurities, such as acetaldehyde, if present. The amount of water in the overhead fraction will be less than about 29 mole percent, based on the weight of the vinyl acetate, or substantially all of the water present in the synthesis product mixture. In general, the gaseous product feed mixture generally contains from about 50 to 65 mole percent water, based on the total amount of the vinyl acetate and water. If only a minor amount of water is recovered overhead, the remainder of the water is recovered along with the acetic acid in the bottoms from the distillation column. It will be understood that conventional distillation equipment may be employed in this stage of the recovery process of this invention, and that the operating conditions employed therein may vary over a wide range provided that substantially all of the vinyl acetate is recovered overhead and that subsantially all of the acetic acid is removed in the bottoms fraction, with the water being distributed between the overhead and bottom fractions depending upon the desired mode of operation. According to one feature of this invention, it has been found important to feed the gaseous feed mixtures to be separated to an intermediate portion of the distillation column. Although the exact feed point is not critical, it is preferred to feed into an intermediate position between the top and bottom of the distillation column and especially to a point which is at least three trays above the bottom of the distillation column.

The bottoms from the distillation column containing the acetic acid, are rectified when water is present to remove the water formed during the synthesis and to concentrate the acetic acid, which may be readily recycled to the aforedescribed synthesis reaction zone along with makeup acetic acid. The rectification may be carried out in conventional distillation equipment. This separation may either be effected at atmospheric pressure or at pressures up to 150 p.s.i.g. When substantially no water is present in the bottoms fraction, the acetic acid may be recycled or recovered as such. The overhead fraction, containing the vinyl acetate product, recovered from the initial distillation zone or column is then treated to recover the vinyl acetate from the ethylene, oxygen, carbon dioxide, acetaldehyde, and water. This can be conveniently achieved by passing the gaseous overhead fraction through a heat exchanger to condense the vinyl acetate. A two phase condensate results. The lower phase is water saturated with minor amounts of vinyl acetate and acetaledhyde. In general, the concentration of the vinyl acetate will be less than about 2% by weight. If it is desired to recover the vinyl acetate from this aqueous phase, recycling to the initial distillation column or zone may be carried out, or the aqueous phase may be treated in a separate distillation. If returned to the original distillation column, its entry can be at some point below the top of the column. When a bottoms fraction, having a low water content from the original distillation step is desired, then the aqueous phase should be sent to a separate distillation column and a portion of the vinyl acetate phase returned to one or more points in the original distillation column, including the top tray.

The upper phase of the aforementioned condensate consists of the vinyl acetate and less than about 2% by weight water. If it is necessary to obtain an anhydrous vinyl acetate product, the upper phase may be treated by any one of known procedures for removal of this minor amount of water. Typical drying procedures which may be employed include distillation and adsorbent drying. When it is deemed necessary to remove the minor amounts of acetaldehyde which may be present in this phase, an intermediate water washing step can be employed, or the vinyl acetate may be distilled with a heads cut taken containing the acetaldehyde. It should be noted that the acetaldehyde, if present, will distribute itself between the organic and aqueous phases.

The ethylene, oxygen and carbon dioxide stream recovered from the condensation step may be treated to separate all or a portion of the carbon dioxide therefrom prior to recycling the ethylene and oxygen to the synthesis reaction zone. Conventional chemical reaction or absorption procedures may be employed to separate the carbon dioxide. A typical procedure comprises passing said gaseous stream into a scrubber employing water or aqueous caustic. For some purposes, it may be unnecessary to separate the carbon dioxide from the ethylene and oxygen, or it may be desirable to treat only a portion of this stream in order to prevent the build-up of excessive amounts of carbon dioxide throughout the synthesis and recovery system. As discussed in copending U.S. patent application Ser. No. 466,445, filed June 23, 1965, the vapor phase process for the production of vinyl acetate may be advantageously operated by having a substantial concentration of carbon dioxide in the reaction gases employed in the synthesis step. Operating in this manner, only a portion of the ethylene, oxygen and carbon dioxide stream recovered from the condensation step is passed to the carbon dioxide separation step. The amount of this gaseous stream treated will be such that the carbon dioxide separated and discarded will correspond approximately to the amount of carbon dioxide produced per pass through the reactor. Consequently, the concentration of carbon dioxide in the reaction gases is maintained constant, and costs involved in treating the entire ethylene oxygen recycle stream for separation of the carbon dioxide is substantially reduced.

The distillation operations described above may be operated at pressures which are lower or higher than those employed in vinyl acetate synthesis step, i.e. within the range of about atmospheric to 150 p.s.i.g., and preferably below 100 p.s.i.g. In continuous operations the use of approximately the same pressures is preferable.

The temperatures employed during the various separation and recovery steps utilized in the process of this invention will obviously be dependent upon the pressures employed as well as upon the designs of the equipment. It will be understood, therefore, that the present invention resides in the particular sequences of operations employed for recovering the vinyl acetate and the unreacted feed materials prior to recycling rather than upon the particular operating conditions of temperature, pressure and the like employed in each of the steps.

For a more complete understanding of this invention, reference is now made to the following description and the accompanying drawing, which is a schematic flow diagram illustrating one particular arrangement of apparatus and the sequential steps suitable for practicing the present vinyl acetate recovery process. Conventional apparatus, such as pumps, valves, and the like, are not shown but the inclusion of such are within the scope of the invention. It will be further understood that modifications as to equipment, its arrangement, the type of materials and their proportions can be resorted to without departing from the concept of this invention.

Hereinafter, all percentages are by mole percent unless otherwise indicated.

Referring now to the drawing, a gaseous reaction mixture including recycle stream 20 and make-up comprising about 71.73% ethylene, 16.3% acetic acid and 7.80% oxygen, 3.27% carbon dioxide, 0.76% vinyl acetate and 0.14% water are passed via line 10 to synthesis or reaction zone 1. The gases are contacted with a palladium catalyst supported on an inert alumina carrier at a temperature of about 123° C., and under a pressure of about 44 p.s.i.g. The resulting gaseous reaction product mixture comprises about 5.05% vinyl acetate, 12.10% acetic acid, 67.69% ethylene, 5.12% oxygen, 3.64% carbon dioxide, 6.4% water, and trace amounts of acetaldehyde. This composition as well as the composition of various fractions recovered in the process of this invention are set forth in Table II. It will be understood, however, that the synthesis reaction may be carried out under such operating conditions and feed ratios that the reaction product will have the broad compositions set forth below:

TABLE I

| | Percent |
|---|---|
| Vinyl acetate | 0.4–16.1 |
| Ethylene | 16.8–83 |
| Carbon dioxide | 0–60 |
| Oxygen | 0.4–19.5 |
| Water | 0.4–16.1 |
| Acetic acid | 0.36–32.4 |
| Acetaldehyde | Trace (<1%) |

Nitrogen and argon may also be present in varying amounts, but it will be understood that the sum total of nitrogen, argon and carbon dioxide will not exceed 60%.

ery system described above is set forth in the following table.

TABLE II

| Components | Line 12<br>Synthesis<br>Product<br>mixture | Line 13<br>Overhead<br>distillation<br>column | Line 17<br>Bottoms<br>distillation<br>column | Line 15<br>Upper<br>liquid<br>condensate | Line 23<br>Lower<br>phase of<br>condensate | Line 16<br>Non-condensed<br>gaseous<br>stream | Line 20<br>Recycle |
|---|---|---|---|---|---|---|---|
| Vinyl acetate | 5.05 | 17.50 | | 95.84 | 5.1 | 1.10 | 1.0 |
| Ethylene | 67.69 | 69.22 | | | | 87.34 | 87.9 |
| Carbon dioxide | 3.64 | 3.73 | | | | 4.72 | 4.3 |
| Oxygen | 5.12 | 5.23 | | | | 6.67 | 6.65 |
| Water | 6.40 | 4.32 | 34 | 4.16 | 94.9 | 0.17 | 0.15 |
| Acetic acid | 12.10 | Trace | 64 | | | | |
| Acetaldehyde | Trace | Trace | | Trace | Trace | Trace | Trace |

The gaseous reaction product mixture, as aforedescribed, is directly passed via line 12 into the intermediate portion of distillation column 2. The distillation is carried out at a bottoms temperature of about 155° C., and at a pressure of about 44 p.s.i.g. The overhead fraction is recovered via line 13, passed through condenser 4 where it is cooled to a temperature at which the vinyl acetate, acetaldehyde, and water condense and pass into separator 5 where the upper organic condensate is removed via line 15. A portion or all of the aqueous phase recovered from separator 5 via line 23 may be recycled to distillation column 2 via line 22 to obtain further rectification therein or may be treated separately in another distillation column to recover the vinyl acetate. As shown, it is also desirable at times to recycle a portion of the upper organic phase recovered from the separator via lines 24 and 25. The relative amounts of recycle of each phase can vary depending upon the mode of operation desired, i.e., the number of trays in the distillation column 2 and the amount of water desired in the effluent acetic acid. For the purposes of this illustrative embodiment, it will be assumed that most of the water present in the synthesis product feed mixture will be recovered along with the acetic acid and only a minor portion of the water is recovered overhead with the vinyl acetate. Consequently, the liquid condensate comprises a two phase system with the lower aqueous phase containing less than about 2% by weight vinyl acetate. A minor amount of acetaldehyde may also be present in this phase. The upper organic phase comprises vinyl acetate, a minor amount of acetaldehyde, and less than about 2% by weight water; it may be further treated by conventional procedures to effect dehydration and removal of residual acetaldehyde, if desired. In the drawing, all or a portion of the organic phase is passed via line 15 into washer 30 where it is contacted with water fed into washer 30 via line 31. The upper phase comprising acetaldehyde-free vinyl acetate containing a minor amount of water is recovered via line 32 and dehydrated, if necessary. A water phase containing the acetaldehyde is recovered via line 33 and is discarded or subjected to further treatment.

The noncondensed gases from separator 5 is removed via line 16, and may be recycled to line 10 via line 20 or a portion thereof treated (not shown) to remove the net carbon dioxide produced during the synthesis reaction. Hence the composition of recycle line 20 has been adjusted to account for the removal of carbon dioxide and any vinyl acetate and water contained in the small purge stream.

Returning to distillation column 2, a bottoms fraction is removed via line 17 and passed to rectification column 3 wherein the acetic acid may be dehydrated. The water is removed overhead via line 18 and the substantially anhydrous acetic acid is removed below via line 19. In accordance with the preferred method of operation, all of the anhydrous acetic acid is recycled via lines 21 and 10 to synthesis reaction zone 1.

One representative flow of material through the recovery system described above is set forth in the following table.

The above embodiment of this invention demonstrates a continuous, unitary process for preparing vinyl acetate and for recovering the vinyl acetate from the resulting reaction product mixture. It also shows the recovery of unreacted synthesis feed materials as well as their recycle to the synthesis reaction zone. The efficiency of the recovery process is revealed by the data in Table II.

It will be understood that the vinyl acetate recovery procedure of this invention can also be readily applied to any gaseous admixture of vinyl acetate, water, acetic acid, etc., regardless of its source.

The vinyl acetate produced and recovered by the process of this invention is especially suitable for use as a monomer in the preparation of polyvinyl acetate. If the vinyl acetate is stored, it is inhibited in the usual manner such as by the addition of a small amount of hydroquinone. In actual polymerization tests, the vinyl acetate exhibited a relatively short induction period which was well within the acceptable limits of material useful for polymerization.

While particular embodiments of this invention are shown above, it will be understood that the invention is obviously subject to variations and modifications without departing from its broader aspects. For example, the gaseous feed admixture may be initially subjected to a partial condensation step to remove the bulk of the acetic acid and water prior to fractional distillation. By removing the bulk of the acetic acid and by not having the vinyl acetate as a liquid in contact with water in the presence of acetic acid, the possibility of hydrolysis taking place during the distillation step is further avoided. It is also possible, as described above, to recover substantially anhydrous acetic acid as the bottoms fraction from the original distillation step.

We claim:

1. A continuous vapor phase process for the preparation of vinyl acetate which comprises:
   (a) reacting ethylene, acetic acid, and oxygen, in vapor form, in a reaction zone at a temperature within the range of about 0° to 350° C. and at a pressure within the range of about atmospheric to 150 p.s.i.g. and in the presence of a metal-containing catalyst selected from the group consisting of palladium and palladium group metals, oxides and salts;
   (b) recovering a gaseous reaction product mixture comprising vinyl acetate, acetic acid, water and other gases selected from the group consisting of ethylene, oxygen, carbon dioxide, acetaledhyde and mixtures thereof;
   (c) distilling said gaseous reaction product mixture to recover (i) a bottoms fraction comprising acetic acid, and (ii) an overhead fraction comprising vinyl acetate and at least a minor proportion of the water initially present in said reaction product mixture and said other gases;
   (d) condensing said overhead fraction to obtain the vinyl acetate in liquid form;
   (e) separating the resulting liquid condensate from noncondensed gases comprising ethylene, oxygen and carbon dioxide;

(f) recycling said noncondensed gases to said reaction zone;

(g) recovering concentrated acetic acid from the bottoms fraction, and recycling said concentrated acetic acid to said reaction zone; and (h) recovering vinyl acetate from said liquid condensate.

2. The process of claim 1 wherein a portion of said noncondensed gases is treated to remove carbon dioxide therefrom, and then recycling said purified ethylene and oxygen.

References Cited

UNITED STATES PATENTS

| | | | |
|---|---|---|---|
| 2,176,500 | 10/1939 | Hyatt | 203—16 |
| 2,431,554 | 11/1947 | Hansley et al. | 260—499 |
| 2,504,045 | 4/1950 | Potts | 203—87 |
| 3,052,610 | 9/1962 | Akaboshi et al. | 203—16 |
| 3,190,912 | 6/1965 | Robinson | 260—497 |
| 3,266,221 | 8/1966 | Avery | 55—68 |

FOREIGN PATENTS 586,489   4/1947   Great Britain.

WILBUR L. BASCOMB, JR., *Primary Examiner.*